United States Patent

Martin-Rossman

[11] Patent Number: 5,211,075
[45] Date of Patent: May 18, 1993

[54] HANDLEBAR MOUNTED BIKE ACCESSORY

[76] Inventor: Linda D. Martin-Rossman, 7950 Huntersknoll Ct., Cincinnati, Ohio 45242

[21] Appl. No.: 873,140

[22] Filed: Apr. 24, 1992

[51] Int. Cl.⁵ .................. B62K 21/12; B62J 39/00
[52] U.S. Cl. .................... 74/551.8; 446/227; 446/279
[58] Field of Search .......... 74/551.8; 248/690, 503, 248/510, 160, 205.2, 908; 446/71, 72, 227, 268, 279, 369, 390, 286; 280/288.4, 202

[56] References Cited

U.S. PATENT DOCUMENTS

| | | | |
|---|---|---|---|
| D. 281,964 | 12/1985 | Rudell et al. | 280/288.4 X |
| 2,168,939 | 8/1939 | Kraeft . | |
| 2,484,343 | 10/1949 | Hawes | 446/268 X |
| 2,578,682 | 12/1951 | Fernstrom | 446/279 X |
| 3,251,241 | 5/1966 | Francis . | |
| 3,318,615 | 5/1967 | Chriest | 280/288.4 |
| 3,945,337 | 3/1976 | Sweetman . | |
| 4,120,561 | 10/1978 | Burkholder | 280/288.4 X |
| 4,321,883 | 3/1982 | Ruppa . | |
| 4,729,751 | 3/1988 | Schiavo et al. | 446/268 |
| 4,744,573 | 5/1988 | Most | 280/288.4 X |

FOREIGN PATENT DOCUMENTS 1430513 3/1976 United Kingdom ............... 446/286

Primary Examiner—Rodney H. Bonck
Attorney, Agent, or Firm—Henderson & Sturm

[57] ABSTRACT

An accessory (10) for bicycle handlebars (101); wherein, the accessory comprises a spring mounted figurine member (20) having its torso (22) and arms (24) releasably engaged with the handlebar (101); and, wherein the figurine member (20) may be removed from the handlebar (101) to serve as a stuffed toy.

4 Claims, 1 Drawing Sheet

HANDLEBAR MOUNTED BIKE ACCESSORY

TECHNICAL FIELD

The present invention relates to the field of bicycle accessories in general, and in particular to a figurine mounted in a simulated riding position relative to the handlebars of a bicycle.

BACKGROUND ART

This invention was the subject matter of Document Disclosure Program Registration No. 289709 which was filed in the U.S. Patent and Trademark Office on Aug. 23, 1991.

As can be seen by reference to the following U.S. Pat. Nos. 3,251,241; 4,321,883; 2,168,939; and 3,945,337; the prior art is replete with myriad and diverse accessories for attachment to the handlebars of a bicycle.

While all of the aforementioned prior art constructions are more than adequate for the basic purpose and function for which they have been specifically designed, these patented structures do not even remotely approximate the purpose and structure embodied in the subject matter of the present invention.

As most adults are aware children seem to be perpetually inclined to festoon their bicycles with myriad and diverse decorative items to express their personal style and also to distinguish their bicycles from those of their playmates.

As a consequence of the foregoing situation, there has existed a longstanding need for a new type of bicycle accessory that will not only produce a unique appearance and cooperate with the bicycle handle bar in a novel manner; but which will also serve as a stuffed toy companion for the child when detached from the bicycle; and the provision of such a construction is a stated objective of the present invention.

DISCLOSURE OF THE INVENTION

Briefly stated, the handlebar mounted bicycle accessory that forms the basis of the present invention comprises a stuffed figurine unit, a spring unit and a plurality of securing units.

The spring unit and the securing units are adapted to form an operative releasable connection between the figurine unit and the bicycle handlebar.

In addition the figurine unit will be provided with a plurality of simulated appendages and a torso that will be releasably secured to the handlebar to dispose the figurine in an upright riding position.

As will be explained in greater detail further on in the specification, the figurine unit is provided with a recess dimensioned to receive the spring unit such that the torso of the figurine unit will be resiliently engaged relative to the handlebar to thereby move in a natural manner as the bicycle traverses uneven terrain.

In addition the figurine unit is also provided with a flap closure that will cover the recess, when the figurine is not installed on the bicycle; such that the figurine unit may function as a normal stuffed toy at other times.

BRIEF DESCRIPTION OF THE DRAWINGS

These and other attributes of the invention will become more clear upon a through study of the following description of the best mode for carrying out the invention, particularly when reviewed in conjunction with the drawings, wherein.

BEST MODE FOR CARRYING OUT THE INVENTION

Figure 1:
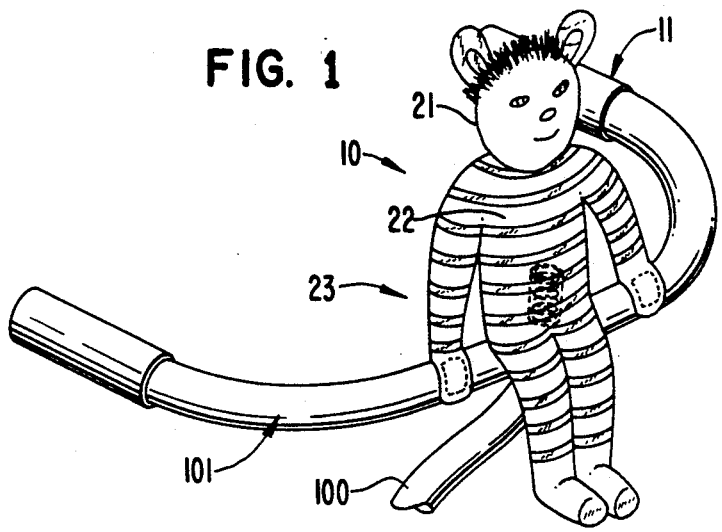
FIG. 1 is a perspective view of the bicycle accessory of this invention deployed on a bicycle.

As can be seen by reference to the drawings, and in particular to FIG. 1, the bicycle accessory that forms the basis of the present invention is designated generally by the reference numeral (10). The accessory (10) comprises in general: a figurine unit (11); a spring unit (12); and, a pair of releasable securing units (13). These units will now be described in seriatim fashion.

Figure 3:
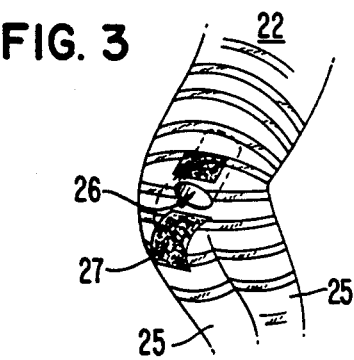
Figure 2:
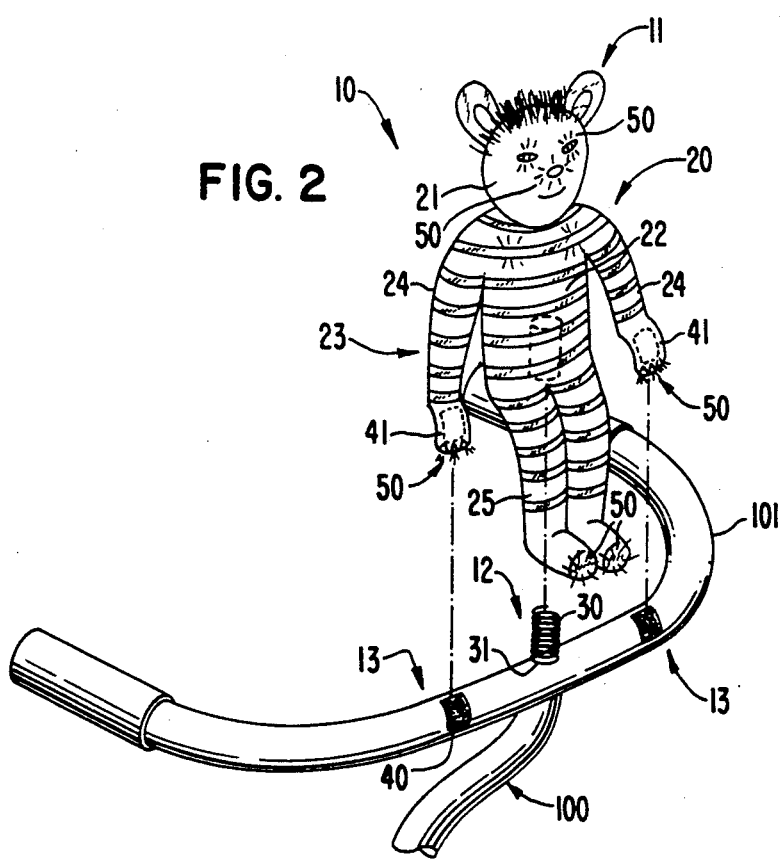
FIG. 2 is an exploded perspective view of the arrangement depicted in FIG. 1; and, FIG. 3 is an isolated detail view of the recess and closure flap of the figurine unit.

As shown in FIGS. 1 through 3 the figurine unit (11) comprises a figurine member (20) provided with a head (21) a torso (22) and a plurality of appendages (23) such as simulated arms (24) and legs (25).

In addition, as can best be seen by reference to FIG. 3, the bottom of the figurine torso (22) is provided with an enlarged elongated recess (26) having a closure flap (27) for selectively covering and uncovering the recess (26), for reasons that will be explained presently, As can best be appreciated by reference to FIG. 2 the spring unit (12) comprises an elongated helical spring (30), which is dimensioned to be received in the elongated recess (26) in the torso (22) and which is secured on one end (31) to the handlebar of a bicycle (100); such that the spring (30) forms the operative releasable connection between the torso (22) of the figurine member (20) and the handlebar (101).

Still referring to FIG. 3, it can be seen that the releasable securing units (13) comprise pairs of hook (40) and loop (41) fasteners which are disposed at spaced locations on the handlebars (101), as well as on the palm portions of the arms (24) of the figurine member (20).

By now it should be appreciated that the figurine member (20) is intended to be disposed in an upright sitting position relative to the bicycle handlebars (101); wherein, the torso (22) of the figurine (20) is supported by the helical spring (30) and the arms (24) of the figurine (20) are releasably engaged to the handlebar (101) by the cooperation of the hook and loop fasteners (40) (41).

Furthermore, the presence of the helical spring (30) within the body cavity recess (26) of the figurine member (20) allows the figurine member (20) to bounce in a natural fashion on the handlebar (101) as the bicycle (100) traverses uneven terrain.

As was also mentioned previously the closure flap (27) is provided to cover the recess (26) when the figurine member (20) is not deployed on the bicycle handlebar (101); such that the figurine unit (11) may also be selectively utilized as a stuffed toy.

In addition this invention further contemplates providing both the head and extremities of the figurine member (20) per se, with reflective elements (50) disposed on the hands, feet, and face portions of the figurine member (20); and, it is further contemplated that the outer covering on the torso 922) of the figurine member (20) will be provided with strips or patches of reflective material (51) to make the bicycle accessory (10) more visible in low light conditions such as at dawn, dusk and dark.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An accessory for use on the handlebar of a bicycle; wherein, the accessory comprises:
   a figurine member releasably associated with said handlebar; wherein, said figurine member is provided with: a head; a torso having a recess, a closure flap for selectively covering said recess, and a plurality of appendages; and,
   spring means forming an operative connection between the figurine member and said handlebar; wherein said spring means is operatively received in the recess in the torso for deploying the figurine member in an upright sitting position relative to said handlebar; when said closure flap is in an uncovered relationship relative to said recess.

2. The accessory as in claim 1; wherein, releasable securing means are disposed on at least some of the appendages of the figurine member and at spaced locations on said handlebar.

3. The accessory as in claim 1; wherein, selected portions of the figurine member are provided with reflective elements.

4. An accessory for use on the handlebar of a bicycle; wherein, the accessory consists of
   a figurine member having a head, a torso having a recess formed in the bottom portion of the torso and a plurality of upper and lower appendages depending downwardly from the torso; wherein, at least the upper appendages are provided with means for releasably securing the upper appendages to said handlebar; and,
   spring means dimensioned to be received in said recess in the bottom portion of the torso wherein said spring means forms an operative connection between the torso of the figurine member and said handlebar; whereby said figurine member will reciprocate in a vertical orientation relative to said handlebar.

* * * * *